United States Patent [19]

Chabinec et al.

[11] Patent Number: 5,631,797
[45] Date of Patent: May 20, 1997

[54] OVERVOLTAGE PROTECTOR

[75] Inventors: David P. Chabinec, Spring Township, Berks County; Dean M. Umberger, Stouchsburg, both of Pa.

[73] Assignee: Lucent Technologies Inc., Murray Hill, N.J.

[21] Appl. No.: 506,287

[22] Filed: Jul. 24, 1995

[51] Int. Cl.$^6$ ................................. H02H 3/20
[52] U.S. Cl. ................. 361/91; 361/56; 361/111; 361/119
[58] Field of Search ................. 361/56, 91, 111, 361/118, 119

Primary Examiner—Jeffrey A. Gaffin
Assistant Examiner—Stephen W. Jackson
Attorney, Agent, or Firm—Scott W. McLellan

[57] ABSTRACT

An overvoltage protection circuit using a diode bridge and a thyristor. The inputs to the bridge (first and second terminals) are coupled to a telephone line to be protected. The positive output of the bridge connects to a ground while the negative output of the bridge (intermediate node) connects through a thyristor to the ground. The thyristor is triggered into conduction when the voltage on the negative output of the bridge exceeds a reference voltage. The reference voltage is preferably the battery voltage for the telephone line.

4 Claims, 1 Drawing Sheet

OVERVOLTAGE PROTECTOR

BACKGROUND OF THE INVENTION

1. Field of the Invention

This invention relates to overvoltage protectors in general and, more particularly, to overvoltage protectors for telephone lines or the like.

2. Description of the Prior Art

Overvoltage protection is necessary to protect both subscriber apparatus and central office equipment from lightning surges and powerline cross. In central offices, there is generally two layers of protection provided: a primary, higher voltage (e.g., 300 volts) and higher power, protector and then a lower voltage (e.g., 90 volts), lower power protector. The first protector usually takes the brunt of any lightning surges and high voltage power line crosses. The lower voltage protector handles the overvoltages that the higher voltage protector either ignores (because the voltage is too low) or manages to get past the primary protector. The voltage limit of the low voltage protector is usually set to a value that would normally cause damage to the central office equipment if left unchecked, such as a power line cross of 120 VAC.

Integrated overvoltage circuits have been available for some time but are not as fast acting as desired. Moreover, the voltage limit of the protector is substantially fixed at the time of manufacture, multiplying the number of different types of protectors needed. For example, the protector for a PBX may have a different voltage limit than that in a central office.

Thus, it is desirable to provide an overvoltage protector having a fast reaction time. Further, it is desirable to provide a protector having a voltage limit that may be varied by the user. Still further, the overvoltage protector should be able to be formed in an integrated circuit, with other circuits if desired, to provide low cost and high reliability.

SUMMARY OF THE INVENTION

These and other aspects of the invention may be obtained generally in an overvoltage protection circuit for limiting the voltage on a telephone line. The circuit has at least a first terminal for coupling to one wire of the telephone line and another terminal for coupling to a ground. The circuit includes first and second diodes and a switch. The first diode has an anode connected to the first terminal and a cathode connected to the ground terminal. The second diode has a cathode connected to the first terminal and an anode connected to an intermediate node. The switch connects between the intermediate node and the ground terminal and closes when the voltage on the intermediate node exceeds a predetermined voltage and remains closed until the current therein falls below a predetermined current.

BRIEF DESCRIPTION OF THE DRAWING

The foregoing features of this invention, as well as the invention itself, may be more fully understood from the following detailed description of the drawings, in which.

DETAILED DESCRIPTION

Figure 1:
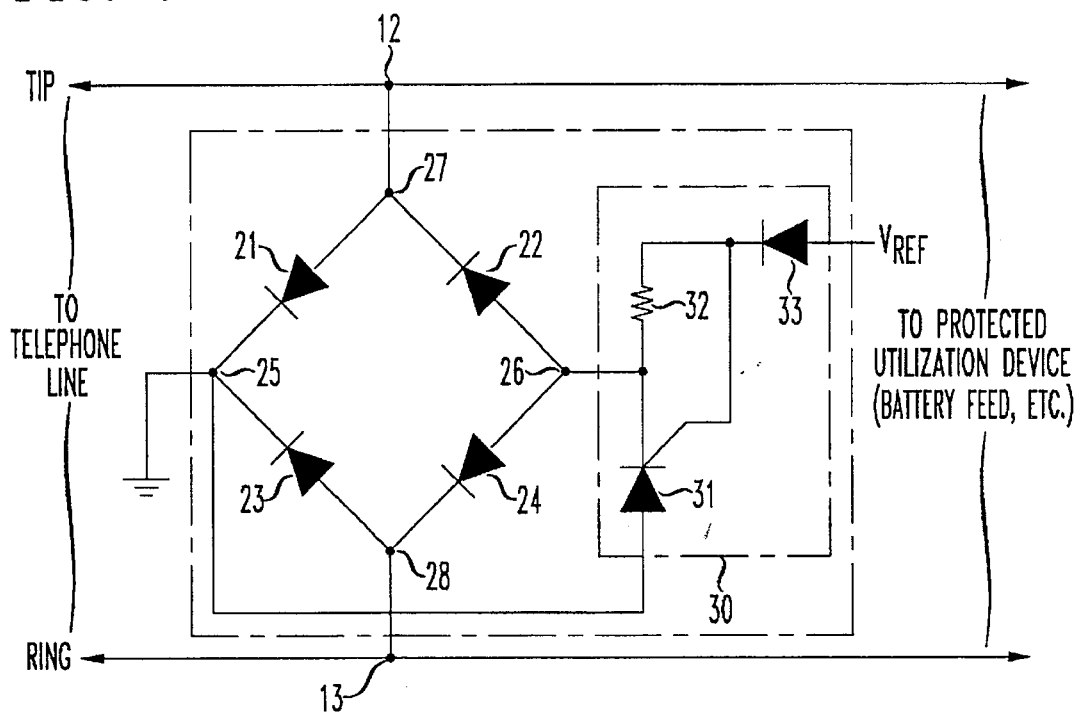
FIG. 1 is an exemplary, simplified schematic diagram of one embodiment of an improved overvoltage protector; and, FIG. 2 is an exemplary block diagram of telephone line circuit utilizing an overvoltage protector according to one aspect of the invention.

Referring to FIG. 1, the invention may be summarized as an overvoltage protection circuit 10 for limiting the voltage on a telephone line. The circuit has at least a first terminal 12 for coupling to one wire of the telephone line and another terminal 25 for coupling to a ground. The circuit includes first and second diodes 21, 22 and a switch 30. The first diode has an anode connected to the first terminal and a cathode connected to the ground terminal 25. The second diode has a cathode connected to the first terminal and an anode connected to an intermediate node 26. The switch connects between the intermediate node 26 and the ground terminal 25 and closes when the voltage on the intermediate node 26 exceeds a predetermined voltage and remains closed until the current therein falls below a predetermined current.

Figure 2:
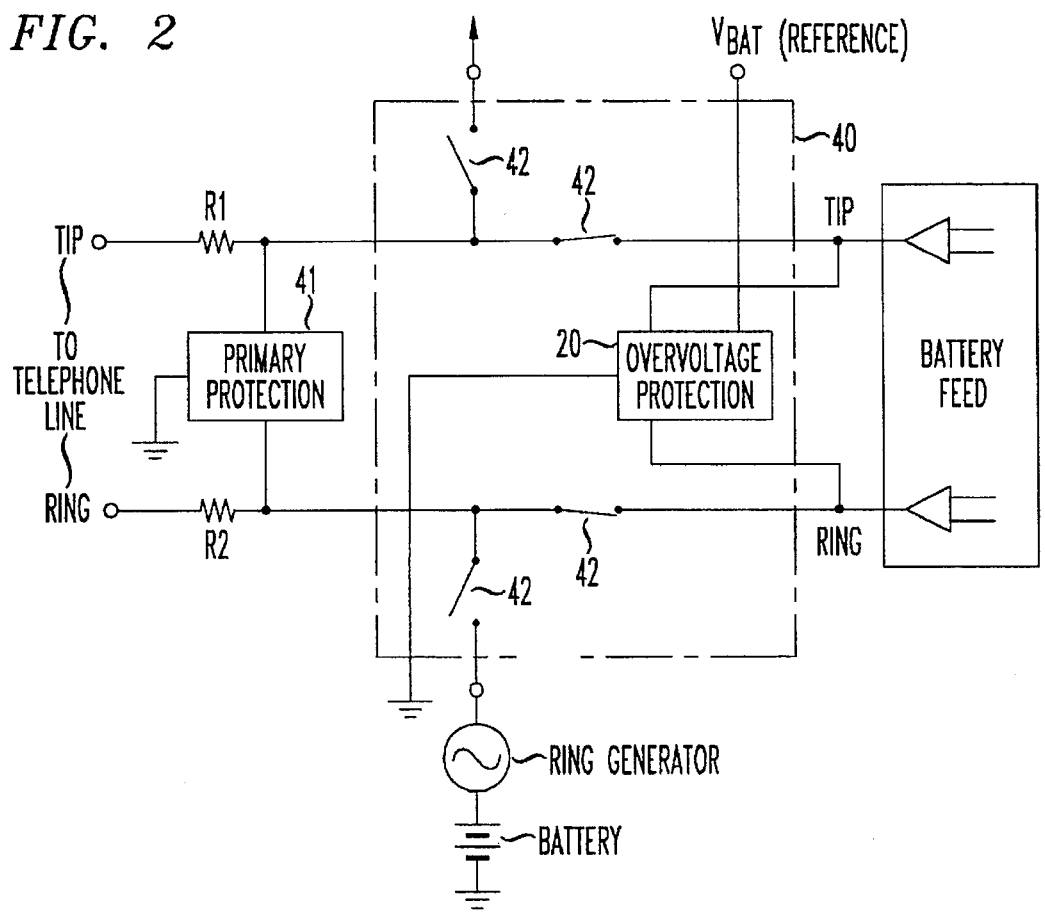

In more detail, the overvoltage protector 10 is shown connecting to a pair of conductors which couple a telephone line (not numbered) to a utilization device, such as a battery feed, as will be shown in FIG. 2. The protector 10 includes a bridge rectifier of diodes 21–24. The inputs 27, 28 of the bridge couple to the telephone line (not numbered). The positive output 25 of the bridge connects to ground, preferably an earth ground where current from the overvoltage can be safely dissipated. The negative terminal 26, also referred to herein as an intermediate node, connects to switch 30. Switch 30 includes a thyristor 31 and a triggering circuit of resistor 32, diode 33 and a reference voltage $V_{REF}$. The thyristor 31 also connects to ground so that, when triggered, the intermediate node 26 is coupled to ground. Triggering of the thyristor 31 occurs when the voltage on node 26 exceeds the reference voltage $V_{REF}$, typically by two to three volts depending on the trigger voltage of the thyristor 31 and the voltage drop across series-coupled diode 33. Resistor 32 assures that the thyristor 31 is not triggered by noise (high dv/dt) until the desired predetermined voltage is exceeded. Typically, resistor 32 is 20 ohms or so depending on application. As will be discussed below, the thyristor 31 and diodes 21–24 must be sized to accommodate the expected voltages and currents before and when an overvoltage occurs.

The reference voltage $V_{REF}$ primarily sets the voltage at which the protector turns on. Typically, the voltage is set to the battery voltage on the telephone line: for example, –48 volts for central office applications and –24 volts for private branch exchange (PBX) applications. The diodes 21–24 and thyristor 31 are typically sized to handle twice the normally expected surge current, here about 5 amperes. The diodes 21–24 and thyristor 31 have a breakdown voltage exceeding the maximum voltage expected (for example, 300 volts or so for central office applications). Thyristor 31 has a holding current (the predetermined current), below which the thyristor 31 returns to a non-conducting state. Typical values for the holding current is approximately 150 mA. Note that the term thyristor refers to latching semiconductor devices generally and other devices may by used for thyristor 31, such as a GTO, SCR, MCT, etc.

In this embodiment, the protector 20 is shown clamping to ground positive voltages and selectively clamping negative voltages (when the voltage exceeds the predetermined voltage) because of the use of negative "talk" battery on the telephone line. However, it is understood that the polarity of the diodes, thyristor and $V_{REF}$ may be reversed for positive battery applications.

Turning to FIG. 2, an exemplary embodiment of a line card application of the overvoltage protector is diagrammed. A primary protector 41 (typically having a clamping voltage of 300 volts or so) is disposed directly across the telephone line (not numbered) and, as mentioned above, absorbs the primary amount of surge from the line. Integrated circuit 40 has the overvoltage protector 20 with a series of switches 42 which selectively provide ringing signal and battery voltage to the telephone line. To protect the switches 42 and protector 20 from extended overvoltages, the switches have a current limit feature to limit the amount of current flowing therein or forces the switches to open. See, for example, U.S. Pat. No. 5,392,349 assigned to the same assignee as this invention and incorporated herein by reference. It is conceived that the overvoltage protector 20 may also be used in conjunction with modems, telephone sets, etc. for overvoltage protection as well. It is understood that the fault detection circuitry shown in the above-referenced U.S. Pat. No. 5,392,349 may be incorporated into the above-described protector.

Having described the preferred embodiment of this invention, it will now be apparent to one of skill in the art that other embodiments incorporating its concept may be used. Therefore, this invention should not be limited to the disclosed embodiment, but rather should be limited only by the spirit and scope of the appended claims.

The invention claimed is:

1. A overvoltage protection circuit for limiting the voltage on a telephone line, the circuit having first and second terminals for coupling to different wires of the telephone line and another terminal for coupling to a ground, CHARACTERIZED BY:

a first diode having an anode connected to the first terminal and a cathode connected to the ground terminal;

a second diode having a cathode connected to the first terminal and an anode connected to an intermediate node;

a third diode having an anode connected to the second terminal and a cathode connected to the ground terminal;

a fourth diode having a cathode connected to the second terminal and an anode connected to the intermediate node;

a thyristor, having a gate, anode and cathode, the cathode connected to the intermediate node and the anode connected to the ground terminal; and, an external voltage source, coupling to the gate of the thyristor, for triggering the thyristor when the voltage on the intermediate node exceeds the voltage source.

2. The overvoltage protection circuit as recited in claim 1, wherein the voltage source is coupled to the gate of the thyristor by a series-coupled diode.

3. The overvoltage protection circuit as recited in claim 2, further characterized by a resistor coupled between the cathode and gate of the thyristor.

4. The overvoltage protection circuit as recited in claim 3, wherein the telephone line has thereon an open-loop battery voltage, and the voltage source being further characterized by the voltage source source voltage having substantially the same voltage as the battery voltage.

* * * * *